W. J. WOODCOCK.
AUTOMOBILE TIRE.
APPLICATION FILED JAN. 3, 1912.

1,042,065.

Patented Oct. 22, 1912.

Attest:
W. J. McGinn
Worthington Campbell

Inventor:
by Willard Jay Woodcock
Redding & Greeley
Attys.

UNITED STATES PATENT OFFICE.

WILLARD JAY WOODCOCK, OF BROOKLYN, NEW YORK.

AUTOMOBILE-TIRE.

1,042,065.  Specification of Letters Patent.  Patented Oct. 22, 1912.

Application filed January 3, 1912. Serial No. 669,208.

*To all whom it may concern:*

Be it known that I, WILLARD JAY WOODCOCK, a citizen of the United States, and resident of borough of Brooklyn, in the county of Kings and State of New York, have invented certain new and useful Improvements in Automobile-Tires, of which the following is a specification.

Tires for automobiles and other vehicles, so far as they are in general use, are classified as solid or cushion tires and pneumatic tires.

The present invention relates to tires of the type of the latter class, in so far as they are hollow, but not so far as they derive their resilience and resistance to the load from the presence within the tire of a body of air under compression, for in accordance with the present invention the improved tires are made to depend for their resilience and resistance to load upon external atmospheric pressure on the sides of the tires, a vacuum or a partial vacuum being formed within the body of the tire which is so formed interiorly that compression tends to increase the area in cross section of the chamber and therefore to decrease the internal pressure below atmospheric and the resistance to the external pressure against the sides of the tire. In this manner the external pressure of the atmosphere against the sides of the tire resists compression of the tire in proportion to the increase of the load and imparts to the tire both resilience and resistance to load. In this way the variations of pressure in a pneumatic tire of the ordinary description, due to changes in temperature, are avoided, the annoyance and danger of blow-outs are eliminated, and the liability to puncture is greatly reduced.

The invention will be more fully explained hereinafter with reference to the accompanying drawing in which it is illustrated and in which—

Figure 1:
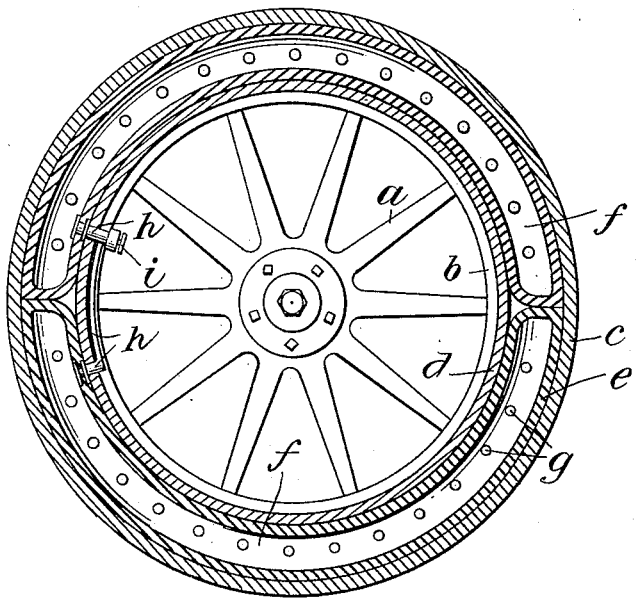
Figure 2:
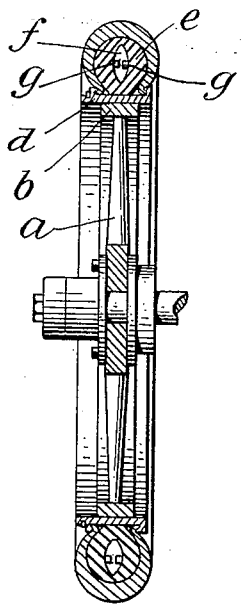

Figure 1 is a view in elevation of an automobile wheel, the tire being shown in section in the plane of rotation. Fig. 2 is a view of the same in diametrical section.

The wheel $a$, having a felly $b$, may be of any usual or suitable construction, since the improved tire can be applied to any wheel and its construction is independent of that of the wheel.

The improved tire may be used either with or without an outer shoe, but is preferably arranged to be used with an outer shoe $c$ of ordinary construction which, in the construction shown, is adapted to be secured in place by a locking rim $d$ of well known construction.

The tire $e$ is made of rubber or other suitable flexible material, with heavy side walls and an internal chamber $f$ which is relatively thin and deep in the plane of rotation. One or both of the opposite walls of the chamber are formed or provided with stops $g$ which are intended to prevent the complete collapsing of the tire under atmospheric pressure when a vacuum or a partial vacuum is formed within the chamber.

The manner of forming the tire with the internal chamber is well known to those skilled in the art and need not be described in detail herein.

The tire may be made in two or more parts as shown in Fig. 1 and each part be provided with a channel $h$ through which the air may be exhausted from the chamber $f$. For convenience in exhausting the air from the several parts of the tire and especially for the purpose of enabling a uniform degree of vacuum to be formed in all parts, the several ducts or channels $h$ may be connected to a common valve-nipple $i$, as clearly shown in Fig. 1, so that by application of an exhaust pump to the valve-nipple $i$ a uniform vacuum can be established in all parts of the tire at one operation. The valve-nipple $i$ may be of any suitable construction, the ordinary tire valve being well adapted for the purpose except that it is inverted so that it opens outwardly and automatically prevents the inlet of air to the chamber of the tire when a vacuum has been formed therein.

In operation it will be understood that the tire is applied to the wheel in any suitable manner. A partial vacuum is formed therein by a suction pump, the complete collapsing of the tire being prevented by the stops $g$. It will also be understood that by reason of the formation of the chamber as a relatively narrow and deep chamber in the plane of rotation the tendency of the atmospheric pressure against the outside of the tire will be to flatten the tire in the plane of rotation. Furthermore not only will the tendency to compression of the tire at the point where it rests upon the road surface, under the load imposed upon it, be resisted by the tendency of the atmospheric pressure to flatten the tire in the plane of rotation, but such compression of the tire as does take place at this point under the influence of a heavy load will tend to increase the cross sectional area of the chamber, as illustrated in the lower part of Fig 2, and therefore to reduce still further the pressure within the chamber below atmospheric and therefore to increase the resistance of the tire to further compression. Obviously the tire or each part of the tire will have its internal resistance reduced throughout its length and the elasticity of the whole tire or of the whole part of the tire will be brought into play as the tire is deformed in contact with the road surface and will tend to restore the tire at all points to its normal shape so that the resilience of the tire will be very great.

It will be understood that the tire may be made in as many parts as may be desirable to suit different conditions of use, that such parts may be secured to the wheel by a common shoe or by any suitable means, and that the shape of the tire may be varied both internally and externally to suit different conditions of use. Furthermore, the degree of vacuum established in the chamber of the tire will be varied to suit different conditions, the degree of vacuum in a tire of given dimensions being rather less for a light vehicle than for a heavier vehicle.

I claim as my invention:—

1. A vehicle tire of flexible material provided with an interior chamber relatively thin and deep in the plane of rotation and having means to prevent the collapsing of the walls of the chamber, a duct for communication with an exhaust pump and means for preventing the admission of air to the chamber, whereby a partial vacuum may be maintained within the tire and deformation of the tire at the road surface resisted by atmospheric pressure against the exterior of the tire.

2. A vehicle tire of flexible material provided with an interior chamber relatively thin and deep in the plane of rotation and relatively thick side walls, said chamber being provided on its opposite walls with stops to prevent complete collapsing of the walls of the chamber, a duct for communication with an exhaust pump and means to prevent the inlet of air to the chamber, whereby a partial vacuum may be maintained within the tire and deformation of the tire at the road surface resisted by atmospheric pressure against the exterior of the tire.

Signed at borough of Brooklyn, city of New York, in the county of Kings and State of New York, this 21st day of December A. D. 1911.

WILLARD JAY WOODCOCK.

Witnesses:
 FRANK W. WOODCOCK,
 AUGUSTA A. WOODCOCK.

---

Copies of this patent may be obtained for five cents each, by addressing the "Commissioner of Patents, Washington, D. C."